May 13, 1941.     W. E. BRILL     2,241,629
OIL COOLED PISTON
Filed April 20, 1940

Inventor
William E. Brill
By
Attorneys

Patented May 13, 1941

2,241,629

UNITED STATES PATENT OFFICE 2,241,629

OIL COOLED PISTON

William E. Brill, Cleveland, Ohio, assignor to General Motors Corporation, Detroit, Mich., a corporation of Delaware Application April 20, 1940, Serial No. 330,638

2 Claims. (Cl. 123—176)

My invention relates to cooling means for pistons of internal combustion engines, air compressors and similar machines having pistons which need to be cooled, the cooling being effected by oil which circulates through the lubricating system to lubricate various parts of the engine, and a considerable volume of which passes into and is trapped within the hollow piston structure and held therein long enough to secure an interchange of heat between the highly heated piston and the cooler lubricating oil before it overflows into the crankcase; and the object of my invention is to provide improved means for controlling the flow of oil into the hollow piston structure, to provide improved means for maintaining a substantial volume of oil within the hollow piston, and to provide various other improvements in and relating to cooling means for pistons, all as will hereinafter and at length appear.

The drawing accompanying and forming a part of this specification illustrates the preferred form of my invention, and therein:

Figure 1:
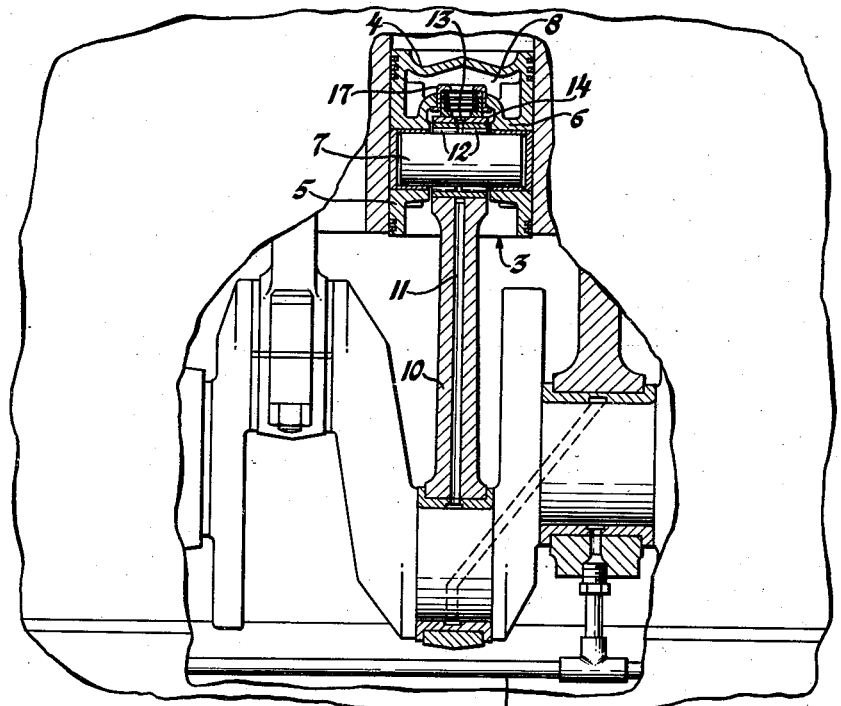
Figure 1 is a fragmentary view, sectional for the most part, showing a piston of an internal combustion engine having cooling means in accordance with my invention.
Figure 3:
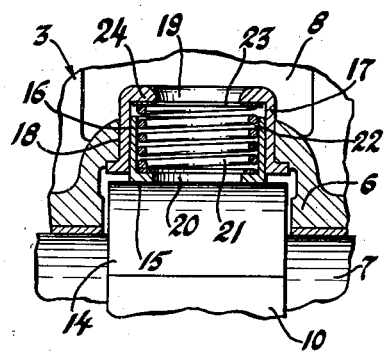
Figure 3 is a fragmentary view showing certain parts of my invention as seen from a position to the right of Figure 2.

Referring now to the drawing, the numeral 3 designates a piston having a head 4, a depending peripheral wall 5 and a transverse partition wall 6, Figure 1, which preferably merges with the bosses which support the ends of a piston pin 7, as shown in Figure 1, whereby an internal oil chamber 8 is provided within and adjacent the upper end of the piston; and from which chamber 8 overflow passages 9, the upper ends of which are disposed above the bottom of the chamber so as to maintain a body of oil therein, lead downward and discharge into the crankcase of the engine.

Figure 2:
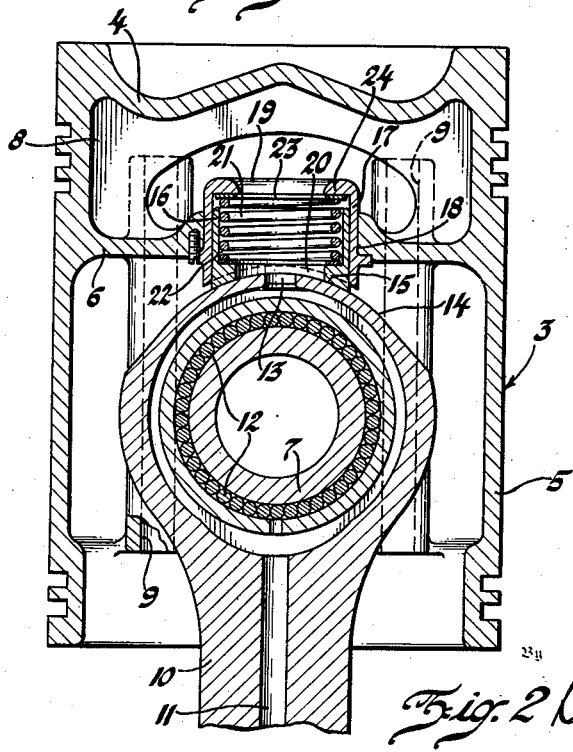
Figure 2 is a similar view showing the piston and upper end of a connecting rod upon a plane at right angles to the plane of Figure 1, and upon a larger scale.

The connecting rod 10 oscillates about the piston pin 7 as a center and has a passage 11 extending along it and around the piston pin and through which lubricating oil is supplied to the piston pin bearings 12, and to the chamber 8 through a port 13 leading into said chamber. The upper end of the rod has a circular seat 14, see Figure 2, which moves in contact with a like seat 15 at the lower end of a cylindrical shoe 16 which is housed within a hollow cylindrical sleeve 17, which fits within and extends through a circular opening 18 in the transverse partition wall 6 and the upper end 19 of which sleeve is open; whereby leakage is prevented as oil flows through the port 13, and through an enlarged registering port 20 in the shoe and into the chamber 8.

The shoe 16 is pressed into contact with the seat 14 by a spring 21 housed within a recess 22 in the upper end of the shoe, to thereby maintain sufficient tightness and prevent the escape of oil as it flows through the ports 13 and 20 and into the chamber 8; the upper end of said spring acting against a washer 23 and an annular abutment 24 at the upper end of the hollow sleeve 17. Oil is supplied to the passage 11 and chamber 8 from the lubricating system 25 as hereinbefore appears.

In view of the premises it will be appreciated that oil is supplied to the chamber 8 below the level of the body of oil maintained therein and into such body of oil by pressure of oil from the forced feed lubricating system, and that a definite and substantial quantity of oil is maintained within said chamber; because no oil can escape therefrom until the level of oil rises above the upper ends of the overflow passages 9 through which it passes to the crankcase. This definite and substantial volume of oil in circulating through the chamber is more effective in cooling the piston than has been the case in prior piston cooling schemes wherein streams of oil have been projected against the inner surfaces of pistons, but wherein no substantial volume of oil has been trapped and held within the piston; and the overflow from the chamber 8 being conducted to a point adjacent the lower end of the piston by the overflow passages 9 it follows that the flow from the chamber cannot coat the interior of the piston with oil, which would be likely to become carbonized under the high temperature conditions present in internal combustion engines.

Having thus described and explained my invention I claim and desire to secure by Letters Patent:

1. In an engine and in combination with a piston having a head, and a piston pin the ends of which are supported in bearings carried by a peripheral wall depending from said head; a connecting rod which oscillates about said piston pin as a center, and which rod has a cylindrical seat at its upper end and a longitudinally extending oil passage; a transverse partition above the upper end of said connecting rod whereby an oil chamber is provided within the upper end of the piston; a hollow cylindrical shoe independent of said piston pin and of the bearings therefor and of said partition, and which shoe is supported by said partition and has a cylindrical seat with which the seat aforesaid contacts and a port through which oil flows into said oil chamber; and an overflow passage leading from the upper part of said chamber downward and discharging into the crankcase of the engine.

2. In an engine and in combination with a piston having a head, and a piston pin the ends of which are supported in bearings carried by a peripheral wall depending from said head; a connecting rod which oscillates about said piston pin as a center, and which rod has a cylindrical seat at its upper end and a longitudinally extending oil passage; a transverse partition above the upper end of said connecting rod whereby an oil chamber is provided within the upper end of the piston; a hollow cylindrical sleeve fitting within an opening in said partition; a hollow cylindrical shoe within said sleeve and having a seat in contact with the cylindrical seat aforesaid, and a port through which oil may flow into said oil chamber; an inwardly extending annular abutment at the upper end of said sleeve; a spring acting between said shoe and said annular abutment to press said two seats into contact with one another; and an overflow passage leading from the upper part of said chamber downward and discharging into the crankcase of the engine.

WILLIAM E. BRILL.